(No Model.) 2 Sheets—Sheet 1.

E. A. & F. CAMERON.

MACHINE FOR DIGGING, CLEANING, AND ASSORTING POTATOES.

No. 379,098. Patented Mar. 6, 1888.

Witnesses.
A. Ruppert
Daniel Scott

Inventors.
F. Cameron,
E. A. Cameron,
Per Thomas P. Simpson
atty (No Model.) 2 Sheets—Sheet 2.

E. A. & F. CAMERON.
MACHINE FOR DIGGING, CLEANING, AND ASSORTING POTATOES.

No. 379,098. Patented Mar. 6, 1888.

Witnesses.
A. Ruppert,
Daniel Scott.

Inventors.
F. Cameron,
E. A. Cameron,
Per
Thomas P. Simpson,
atty.

UNITED STATES PATENT OFFICE.

EDWIN AUGUSTUS CAMERON AND FRED CAMERON, OF TINMOUTH, VERMONT.

MACHINE FOR DIGGING, CLEANING, AND ASSORTING POTATOES.

SPECIFICATION forming part of Letters Patent No 379,098, dated March 6, 1888.

Application filed November 2, 1887. Serial No. 254,090. (No model.)

*To all whom it may concern:*

Be it known that we, EDWIN AUGUSTUS CAMERON and FRED CAMERON, citizens of the United States, residing at Tinmouth, in the county of Rutland and State of Vermont, have invented certain new and useful Improvements in Machines for Digging, Cleaning, and Assorting Potatoes at one Operation; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a machine which will at one operation dig, clean from dirt, assort, and gather potatoes.

Figure 1:
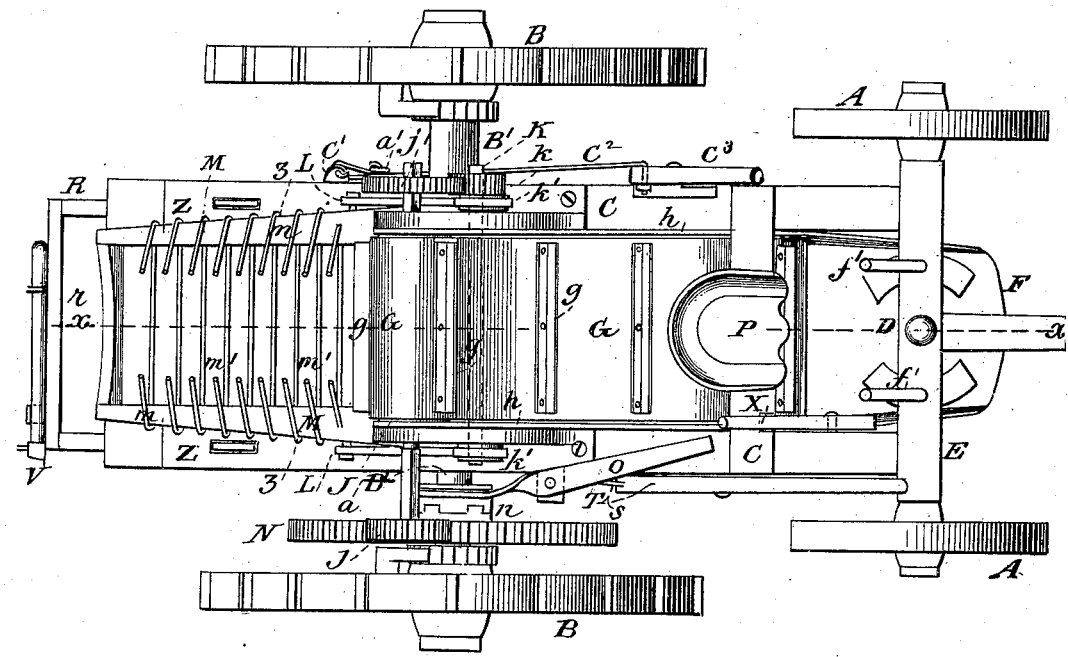
Figure 2:
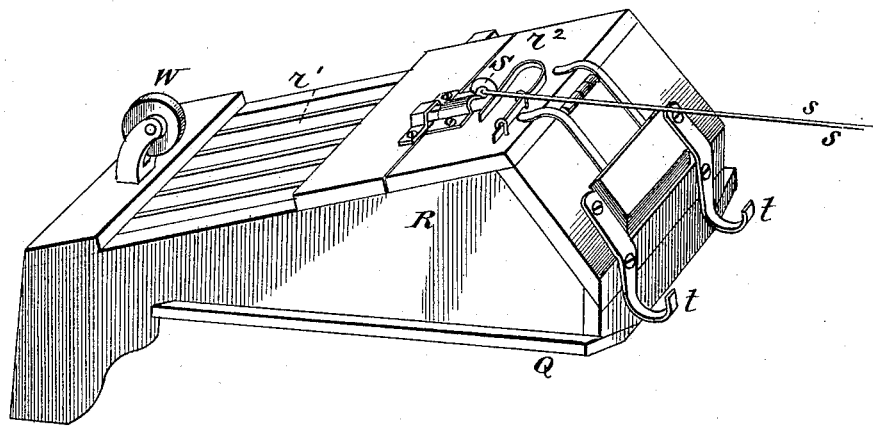
Figure 3:
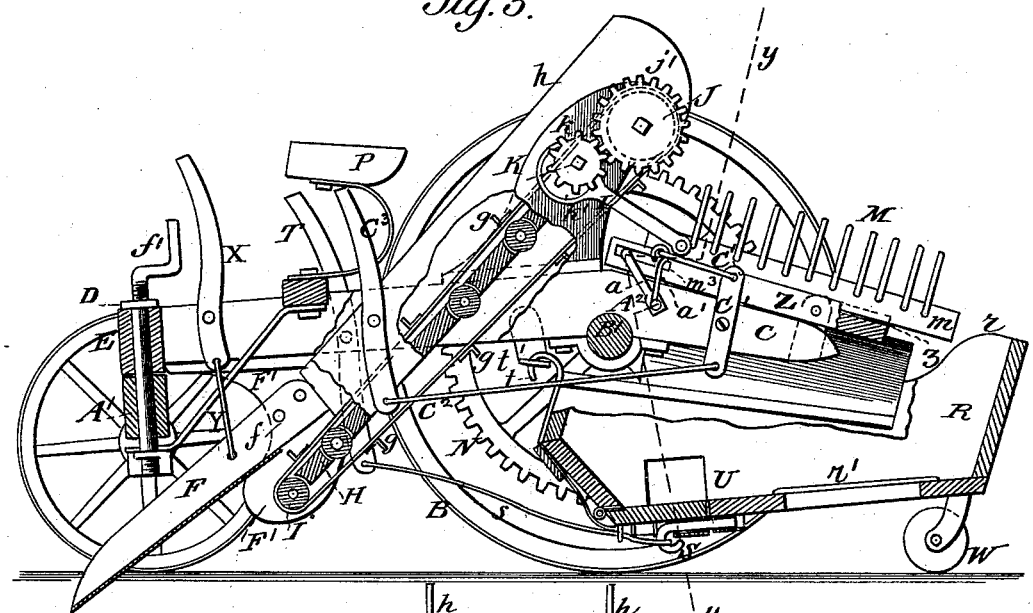
Figure 4:
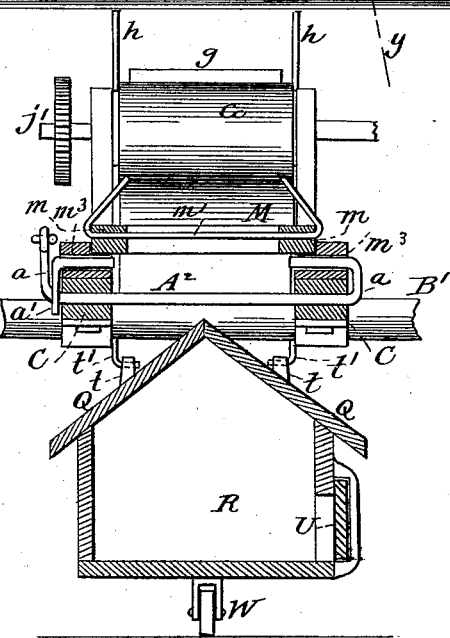

Figure 1 of the drawings is a plan view of our invention; Fig. 2, an elevation in perspective of the gatherer, showing its bottom part; Fig. 3, a vertical longitudinal median section on line $x\,x$ of Fig. 1; and Fig. 4 is a vertical cross-section on line $y\,y$ of Fig. 3.

In the drawings, A A represent front wheels; B B, rear wheels, and C the connecting-frame, in which, at the bottom thereof, is journaled the axle B' of the rear wheels. The front axle, A', turns on the king-bolt D, passing down through the front cross bar or bolster, E, of the frame C.

F is the shovel or lifting plow, which runs under the hills of potatoes and causes the potatoes with the dirt to pass up to and out of its rear end upon the endless belt G, which is provided with the transverse carriers $g$. The latter, together with the sides $h\,h$ of the platform H, upon which the belt is moved, prevent either a backward or lateral escape of the potatoes, as well as of some of the dirt. The belt runs over the bottom roller, I, and the elevated drum J, carrying the terminal spur-wheels $j\,j'$. The latter gears with the end pinion, $k$, on a shaft, K, which carries eccentrics $k'\,k'$, to reciprocate the yokes L L, for actuating the shaking riddle M. The drum-shaft pinion $j$ meshes with the large spur-wheel N on the axle B'. The wheel N may be connected with the axle by a clutch, $n$, operated by a hand-lever, O, which projects up near the driver's seat P, so that it may be thrown out of gear with the axle when the machine is not at work.

The longitudinally-shaking riddle M consists of the wooden frame $m$ and the transverse wires $m'$, which pass through opposite sides of the frame, and then are bent back over the riddle at an acute angle, to prevent the large or merchantable potatoes from jumping out at the sides. The small potatoes pass down between the wires $m'$ to the laterally-shelving board Q, inclined from the middle toward each side, so as to throw them on each side of the row which is being dug or plowed out. The large or merchantable potatoes pass longitudinally over the riddle M and fall through the opening $r$ into the gatherer, in whose bottom is a stationary riddle or sieve, $r'$, through which passes any dirt which may have accompanied them.

In the bottom of the gatherer R is a spring-door, $r^2$, which automatically closes and keeps closed, being fastened by the spring-catch S, which is connected by a cord, $s$, to a lever, T, near the driver's seat.

$t\,t'$ are hooks and eyes which secure the gatherer to the body of the digger.

Thus the driver opens the door to drop the merchantable potatoes in the open furrow which has been plowed out, and the door is spring-actuated to close itself. If desired, however, the potatoes may be taken out in a basket or other receptacle at the side by means of the slide-door U, when the rake V may be employed.

Under the rear end of the gatherer R, and at about the middle of said end, is located the caster-wheel W, by which the gatherer may with facility turn at short corners.

The shovel F may be adjusted by the holes $f$ in its arms F' F', or by the lever X and rod Y, the lever being within easy reach of the driver.

In going up or down a hill the inclination of the shaking riddle M is decreased or increased, according to the grade, by lowering or raising its upper end. For this purpose the guide-frame Z, on which the riddle M rests and reciprocates in the grooves $z\,z$, is slotted at $m^3\,m^3$, to form bearings for the cranks $a\,a$ on the shaft $A^2$, that is journaled in the frame C. This shaft has also an arm, $a'$, with an eye on its upper end, and this eye connects by a pivoted eyebolt with one end of a lever, $C'$, while the other end of said lever connects by a pivoted pitman, $C^2$, with the hand-lever $C^3$ near the driver's seat. By this means the driver can always give the desired pitch or inclination to the shaking riddle in going up or down hill. The dirt, roots, and vines will, for the most part, after passing over the rear of the shovel, pass out between the belt and shovel; but what dirt and small pieces of root or vine accompany the potatoes will be separated therefrom and passed through the shaking and stationary riddles.

Having thus described all that is necessary to a full understanding of our invention, what we claim as new, and desire to protect by Letters Patent, is—

1. The combination, with the riddle M, of the guide-frame Z, having grooves $z\ z$ and slots $m^3\ m^3$, the shaft $A^2$, having cranks $a\ a$, journaled in the frame C, and the arm $a'$, with an eye on its upper end, the lever $C'$, connected by a pivoted bolt with said shaft-eye, the pivoted pitman $C^2$, and the hand-lever $C^3$, whereby the pitch of riddle in going up and down hill may be regulated, as set forth.

2. In a potato-digger, the shaking riddle M, consisting of the frame $m$ and the transverse wires $m'$, the latter passing through the opposite sides of the said frame and then bent back over the riddle at an acute angle, as and for the purpose set forth.

3. In a potato-digger, the combination, with a shaking riddle, M, of the gatherer R, having the opening $r$, and the roof-board Q, inclined laterally downward from its longitudinal middle, whereby the potatoes may be assorted, as described.

In testimony whereof we affix our signatures in presence of two witnesses.

EDWIN AUGUSTUS CAMERON.
FRED CAMERON.

Witnesses:
B. E. HORTON,
JOEL C. BAKER.